(12) United States Patent
Croak et al.

(10) Patent No.: US 7,948,965 B1
(45) Date of Patent: May 24, 2011

(54) METHOD AND APPARATUS FOR SELECTING NETWORK RESOURCES ACCORDING TO SERVICE SUBSCRIPTION INFORMATION

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 786 days.

(21) Appl. No.: 11/025,398

(22) Filed: Dec. 29, 2004

(51) Int. Cl.
*H04L 12/08* (2006.01)
(52) U.S. Cl. ............... 370/351; 370/352; 370/522
(58) Field of Classification Search .............. 370/351, 370/352, 522, 353, 354, 355, 356, 466, 469; 709/227, 228
See application file for complete search history.

(56) References Cited

U.S. PATENT DOCUMENTS

| | | | | |
|---|---|---|---|---|
| 6,665,293 | B2 * | 12/2003 | Thornton et al. | 370/352 |
| 6,981,029 | B1 * | 12/2005 | Menditto et al. | 709/217 |
| 7,136,372 | B1 * | 11/2006 | Nilsen | 370/352 |
| 7,145,898 | B1 * | 12/2006 | Elliott | 370/352 |
| 2005/0190743 | A1 * | 9/2005 | Marcu et al. | 370/352 |

* cited by examiner

*Primary Examiner* — Ricky Ngo
*Assistant Examiner* — David Oveissi

(57) ABSTRACT

The invention comprises a method and apparatus for providing at least one service. Specifically, the method comprises obtaining at least one connection request associated with at least one user, determining the at least one service subscribed to by the at least one user where the at least one service comprises at least one service attribute and the at least one service attribute identifies at least one border element capable of supporting the at least one service, selecting the at least one border element according to the at least one service attribute, and responding to the at least one connection request using the at least one border element.

14 Claims, 4 Drawing Sheets

METHOD AND APPARATUS FOR SELECTING NETWORK RESOURCES ACCORDING TO SERVICE SUBSCRIPTION INFORMATION

FIELD OF THE INVENTION

The invention relates to the field of communication networks and, more specifically, to enabling subscription-based feature usage.

BACKGROUND OF THE INVENTION

Although advanced service features typically facilitate the marketing of various services by service providers, support for such service features may require extensive capital expenditures (i.e., procurement, deployment, and maintenance of advanced network resources for supporting the service features). Furthermore, development of associated service logic required for supporting such service features may be quite difficult. In order to ensure adequate support for requests for advanced service features from all callers, service providers continually upgrade significant portions of the existing network infrastructure. Unfortunately, such infrastructure upgrades are performed regardless of actual usage of the advanced service features by callers.

Accordingly, a need exists in the art for a method and apparatus for using service subscription information for selecting network resources for responding to service requests.

SUMMARY OF THE INVENTION

In one embodiment, the invention comprises a method and apparatus for providing at least one service. Specifically, the method comprises obtaining at least one connection request associated with at least one user, determining the at least one service subscribed to by the at least one user where the at least one service comprises at least one service attribute and the at least one service attribute identifies at least one border element capable of supporting the at least one service, selecting the at least one border element according to the at least one service attribute, and responding to the at least one connection request using the at least one border element.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of an Internet Protocol (IP) network architecture; however, the methodology of the invention can readily be applied to other network architectures. An IP network is broadly defined as a network that uses Internet Protocol to exchange data packets. A VoIP network is broadly defined as a network that is capable of carrying voice signals as packetized data over an IP network. In general, the present invention enables a service provider to select border element, network resources, call handling treatments, and media handling treatments using service subscription information, and to establish connections using the border elements according to the call handling treatments and media handling treatments.

The present invention enables service providers to perform network infrastructure upgrades according to forecasted service subscription information and actual service subscription information. As such, the methodologies of the present invention obviate the need for a service provider to perform expensive network infrastructure upgrades for ensuring that each deployed network resource is capable of supporting advanced service features. In other words, by configuring a portion of available network resources to support a particular service feature, and assigning connections to network resources based on service feature subscription information, service providers ensure that advanced network resources are consumed only by those users capable of requesting that particular service feature.

Figure 1:
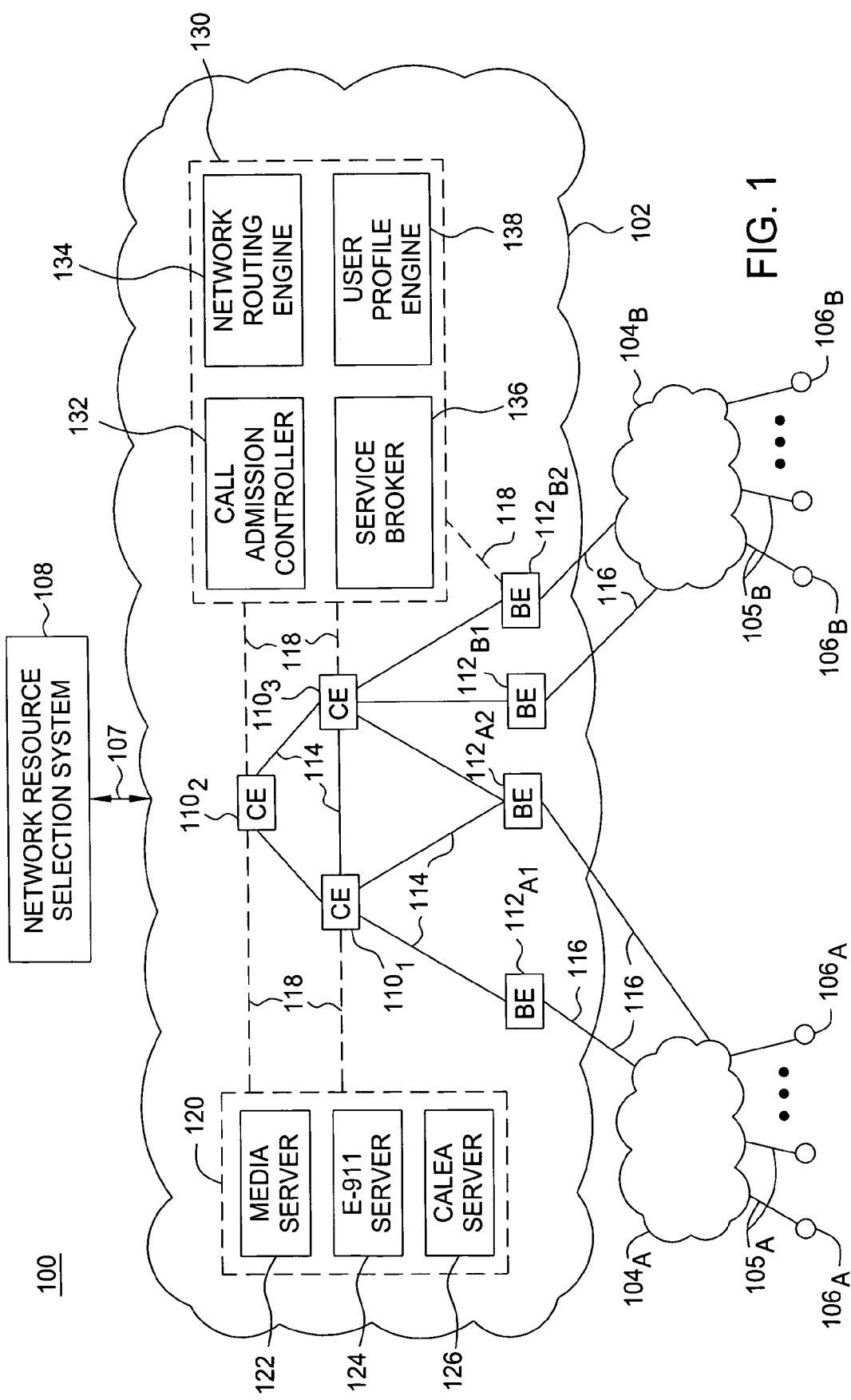
FIG. 1 depicts a high level block diagram of an Internet Protocol network architecture.

FIG. 1 depicts a high level block diagram of an Internet Protocol (IP) network architecture. Specifically, network architecture 100 of FIG. 1 comprises IP network 102, a plurality of access networks (ANs) $104_A$-$104_B$ (collectively, ANs 104), respective pluralities of network endpoints $106_A$-$106_B$ (collectively, network endpoints 106), and a network resource selection system (NRSS) 108. As depicted in FIG. 1, the network endpoints $106_A$ and $106_B$ access the ANs $104_A$ and $104_B$ via respective pluralities of access communication links (ACLs) $105_A$-$105_B$ (collectively, ACLs 105).

The IP network 102 comprises a plurality of core elements (CEs) $110_1$-$110_3$ (collectively, CEs 110), a plurality of border elements (BEs) $112_{A1}$, $112_{A2}$, $112_{B1}$, and $112_{B2}$ (collectively, BEs 112), a plurality of resource servers (RSs) 120 (collectively, RSs 120), and a plurality of service elements (SEs) 130 (collectively, SEs 130). The CEs 110, BEs 112, RSs 120, and SEs 130 are collectively denoted as network components. As depicted in FIG. 1, the CEs 110 and the BEs 112 communicate via a plurality of core communication links 114, and the BEs 112 communicate with the ANs 104 via a respective plurality of communication links 116. The BEs $112_{A1}$ and $112_{A2}$ communicate with AN $104_A$, and BEs $112_{B1}$ and $112_{B2}$ communicate with AN $104_B$.

In general, CEs 110 comprise network elements over which network traffic is carried between the BEs 112. In one embodiment, at least a portion of the CEs 110 may comprise call control elements (CCEs) for managing the BEs 112. For example, the CEs 110 may monitor the congestion level of the BEs 112, set up and tear down call legs in IP network 102, enforce various routing policies, instruct the BEs 112 to redirect media channels associated with a particular call to a different destination, communicate with other IP networks (not depicted), and provide like functionality.

In one embodiment, as depicted in FIG. 1, at least a portion of the functionality supported by each of the CEs 110 may differ across the CEs 110. For example, CE $110_1$ and CE $110_2$ may support Dual Tone Multi-Frequency (DTMF) detection, while CE $110_3$ may not support DTMF detection. Similarly, for example, CE $110_1$ and CE $110_2$ may support monitoring of the congestion levels of the BEs 112, while CE $110_3$ may not support monitoring of the congestion levels of the BEs 112. Although described herein with respect to DTMF detection
} and monitoring of network congestion levels, the CEs 110 may be configured to support various other combinations of service features and associated functionality.

The BEs 112 may comprise network elements through which ANs and associated network endpoints connect to a service provider network. In one embodiment, BEs 112 may perform functions such as routing, call admission control (CAC), media control, security, signaling, and the like. For example, a BE may translate between Session Initiation Protocol (SIP) and a variety of access protocols, enforce security to prevent unauthorized access to the network, enforce admission policies in accordance with CAC (such as call gapping, bandwidth management, and the like), detect DTMF and similar in-band user requests, examine media streams, redirect media streams in response to instructions from a CE, and the like.

In one embodiment, a BE 112 may comprise a network gateway BE for controlling traffic between a circuit-switched network and packet-switched IP network 102. In another embodiment, a BE 112 may comprise a SIP BE for controlling traffic between SIP-based networks and IP network 102. In another embodiment, a BE 112 may comprise a H.323 BE for controlling traffic between H.323 customer premise equipment (CPE) gateway networks and IP network 102. In another embodiment, a BE 112 may comprise a Media Gateway Control Protocol (MGCP) BE for controlling traffic between a MGCP network and IP network 102.

As depicted in FIG. 1, the ANs 104 may comprise ANs operable for providing access to IP network 102. As such, the ANs 102 may comprise at least one of: an IP network, a Publicly Switched Telephone Network (PSTN), a cable network, a Digital Subscriber Line (DSL) network, a wireless AN, and like ANs as known in the art. Furthermore, depending upon the AN 104, the network endpoints 106 may comprise at least one of: an IP phone, a SIP phone, a wireless phone, a standard TDM phone, an ISDN phone, a computer, and like network endpoints as known in the art.

In one embodiment, as depicted in FIG. 1, at least a portion of the functionality supported by each of the BEs 112 may differ across the BEs 112. For example, BE $112_{A1}$ and BE $112_{B1}$ may support DTMF detection, while BE $112_{A2}$ and BE $112_{B2}$ may not support DTMF detection. Similarly, for example, BE $112_{A1}$ and BE $112_{B1}$ may support redirection of media streams in response to instructions from the CEs 110, while BE $112_{A2}$ and BE $112_{B2}$ may not support redirection of media streams in response to instructions from the CEs 110. Although described herein with respect to DTMF detection and redirection of media streams, the BEs 112 may be configured to support various other combinations of functionality.

As depicted in FIG. 1, the RSs 120 comprise a media server 122, an E-911 server 124, and a CALEA server 126. The media server 122 may handle and terminate media streams, providing functions such as announcement, text-to-speech (TTS), automatic speech recognition (ASR), call bridging, and like functionality. The E-911 server 124 may route emergency calls to appropriate Public Safety Answering Points (PSAPs). The CALEA server 126 may intercept various communications for law enforcement and other purposes, providing a capability to identify and collect the content of voice calls.

As depicted in FIG. 1, SEs 130 comprise a call admission controller (CAC) 132, a network routing engine (NRE) 134, a service broker (SB) 136, and a user profile engine (UPE) 138. The CAC 132 may provide network-wide admission policy enforcement, capacity management, congestion control, firewall restriction control, address translation, and like functionality. The NRE 134 may provide route information to the CEs 110 and BEs 112 for establishing call legs between source and destination BEs, and may maintain a database comprising lists of BEs through which a user may be reached. The SB 136 may provide addresses to CEs operating as CCEs, and may maintain service subscription information using a database of installed and activated services. The UPE 138 maintains user profiles comprising user data, such as presence information, service subscription information, and like user data.

Although three RSs and four SEs are depicted and described herein, those skilled in the art will appreciate that fewer or more RSs and SEs may be utilized by IP network 102 for providing various IP-based services. Similarly, although depicted as communicating with a portion of the CEs 110 and BEs 112, each of the RSs 120 and SEs 130 may communicate with other network components within IP network 102, with the ANs 104, and with other networks and network components (not depicted). Furthermore, although depicted as physically centralized, it should be noted that at least a portion of the RSs 120 and SEs 130 may be physically and/or logically distributed across a variety of systems.

Although not depicted, it should be noted that each of the CEs 110 may maintain respective SIP sessions with each of the BEs 112. Similarly, as depicted in FIG. 1, the RSs 120 and SEs 130 maintain a plurality of SIP sessions 118 with a portion of the CEs 110 and BEs 112. Although specific combinations of communications links and SIP sessions are depicted, those skilled in the art will appreciate that fewer or more communication links and SIP sessions may be used, and that the various network components and access networks may communicate via other associated networks and network equipment (not depicted).

As described herein, each of the network components (e.g., BEs, CEs, RSs, SEs, and the like) may be configured to support different capabilities based on service feature adoption (i.e., based on the percentage of users subscribing to particular service features). For example, providing support for DTMF detection is expensive (due to both capital costs and operational costs). As such, assuming that 50% of a service providers' customers subscribe to features requiring DTMF detection, using the methodologies of the present invention a service provider may only configure 50% of the deployed BEs (BE $112_{A1}$ and BE $112_{B1}$ as depicted and described with respect to FIG. 1) to support DTMF detection.

As depicted in FIG. 1, NRSS 108 determines services subscription information associated with users attempting to access IP network 102, selects call handling treatments and media handling treatments according to service attributes associated with the service subscription information, responds to connection requests according to selected treatments, identifies network resources (e.g., network components, service logic, and the like) operable for supporting the selected treatments, and performs like functions. As such, in one embodiment, at least a portion of the methodologies of the present invention may be performed by NRSS 108. As depicted in FIG. 1, NRSS 108 communicates with IP network 102 via communication link 107. Although not depicted, in one embodiment, NRSS 108 may be located within IP network 102.

Although a specific network topology is depicted and described with respect to FIG. 1, those skilled in the art will appreciate that IP network architecture 100 of FIG. 1 may be implemented using a variety of network topologies without deviating from the scope of the present invention. As such, although specific numbers of ANs 104, network endpoints 106, CEs 110, BEs 112, RSs 120, SEs 130, and communication links are depicted and described with respect to FIG. 1, it should be noted that fewer or more ANs 104, network endpoints 106, CEs 110, BEs 112, RSs 120, SEs 130, and communication links may be deployed. Similarly, although one NRSS 108 is depicted, a plurality of NRSSs may be deployed for implementing the methodologies of the invention.

Figure 2:
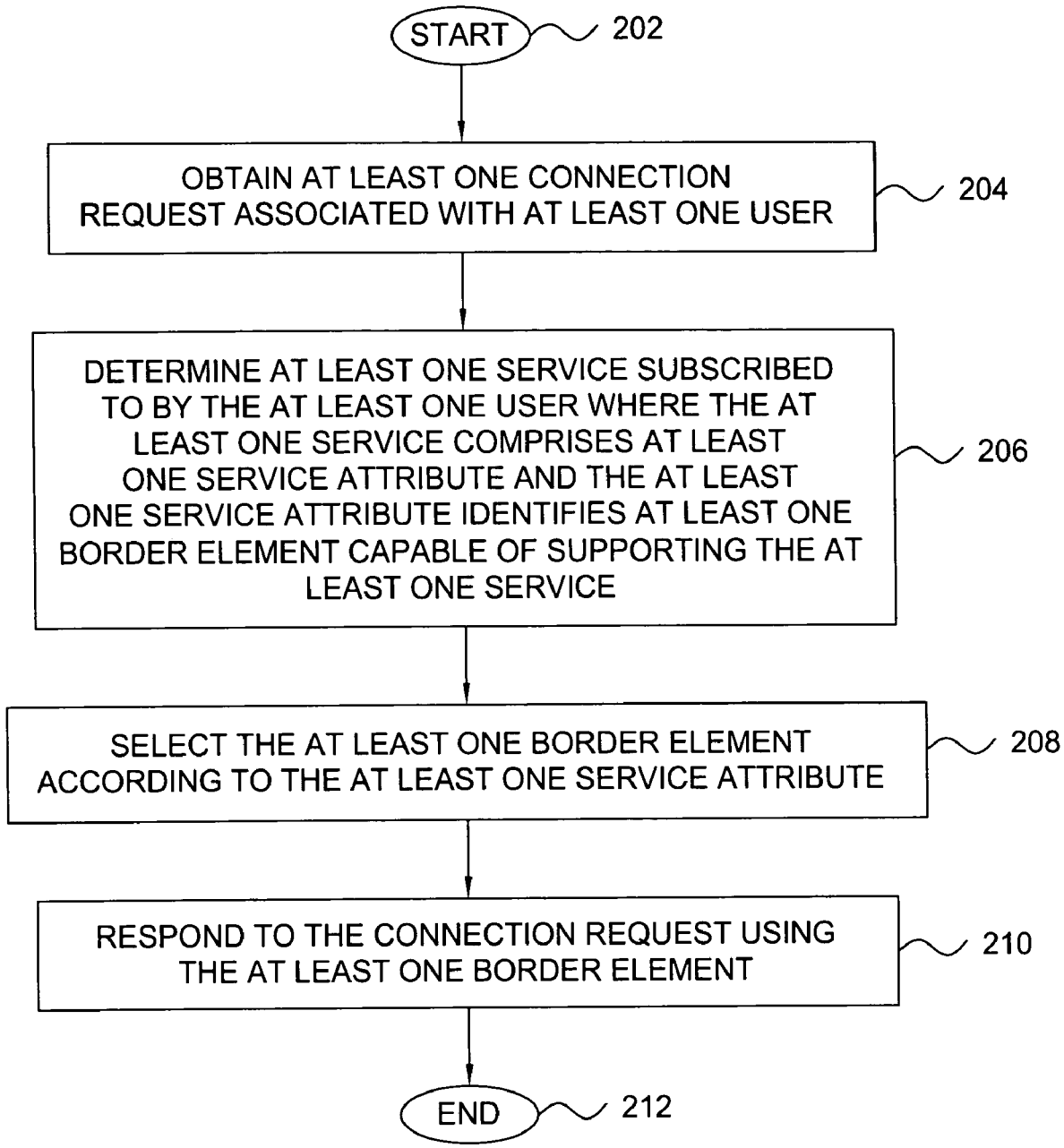
FIG. 2 depicts a flow diagram of a method according to one embodiment of the invention.

FIG. 2 depicts a flow diagram of a method according to one embodiment of the invention. Specifically, method 200 of FIG. 2 comprises a method for providing at least one service. The method 200 is entered at step 202 and proceeds to step 204. At step 204, at least one connection request associated with at least one user is obtained. At step 206, the at least one service subscribed to by the at least one user is determined, where the at least one service comprises at least one service attribute and the at least one service attribute identifies at least one border element capable of supporting the at least one service. At step 208, the at least one border element is selected according to the at least one service attribute. At step 210, the at least one connection request is responded to using the at least one treatment. The method 200 then proceeds to step 212 where method 200 ends.

Figure 3:
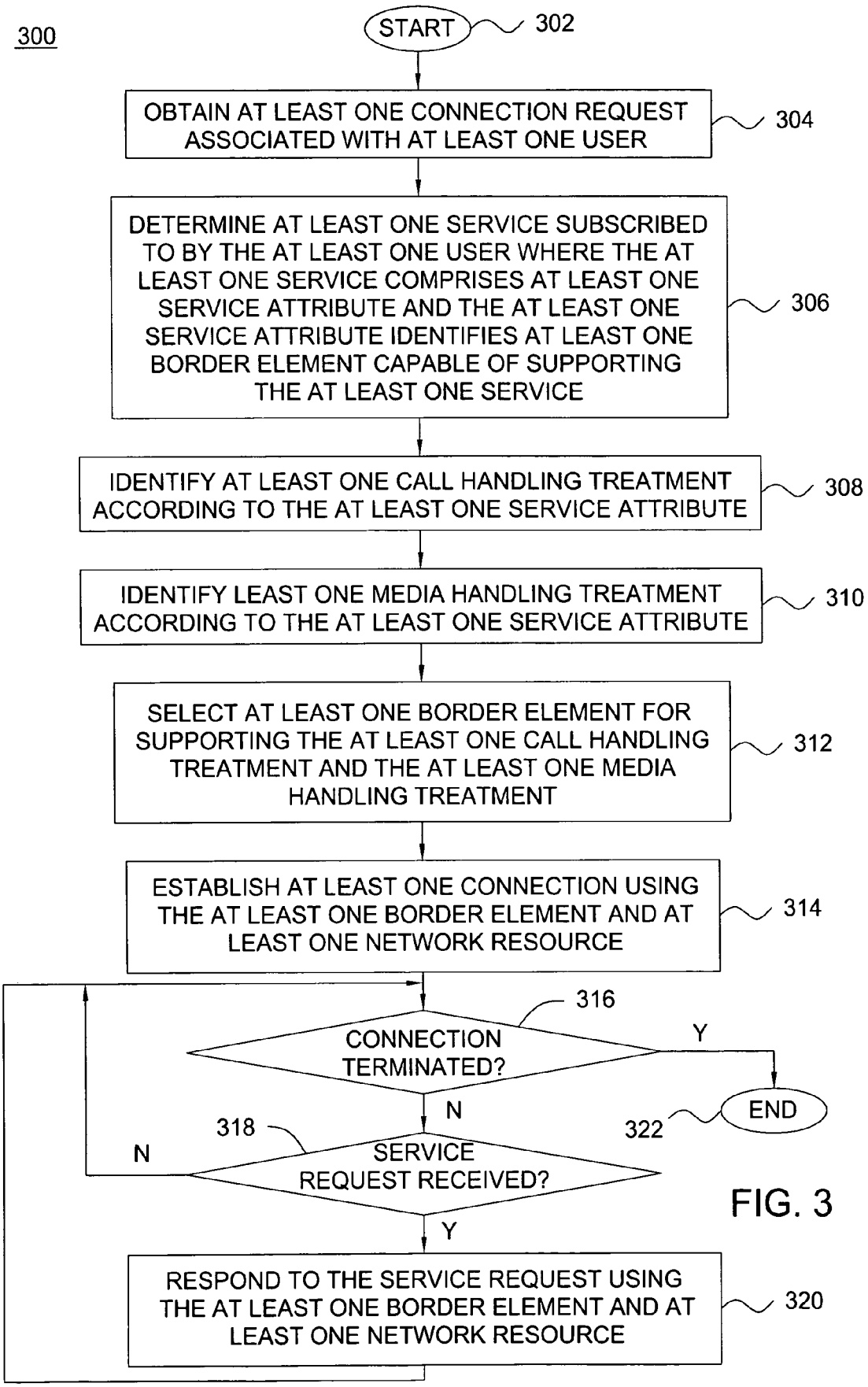
FIG. 3 depicts a detailed flow diagram of the method depicted in FIG. 2.

FIG. 3 depicts a detailed flow diagram of the method depicted in FIG. 2. As such, a single step as depicted in FIG. 2 may correspond to multiple steps as depicted in FIG. 3. Specifically, method 300 of FIG. 3 comprises a method for providing at least one service. Although depicted as being performed serially, those skilled in the art will appreciate that at least a portion of the steps of method 300 may be performed contemporaneously.

The method 300 is entered at step 302 and proceeds to step 304. At step 304, at least one connection request associated with at least one user is obtained. For example, a user associated with one of the network endpoints 106$_A$ may initiate a call to a user associated with one of the network endpoints 106$_B$. For example, in one embodiment, the initiation of the call results in the generation of a connection request for establishing a connection between the network endpoints.

At step 306, at least one service subscribed to by the at least one user is determined. In one embodiment, the at least one service subscribed to by a user is determined by querying at least one service subscription database. In one such embodiment, a service subscription database comprises a mapping between a user and any services subscribed to by that user. In one embodiment, at least one of the network components (e.g., SB 136, UPE 138, and like network components) comprises a service subscription database. In another embodiment, at least one remote system (e.g., NRSS 108) comprises a service subscription database.

In general, a service comprises at least one service feature, such as network-hosted phonebook support, conference calling, voicemail, call logging, caller identification, speed dialing, call forwarding, three-way calling, call waiting, modem services, fax services, and like service features as known in the art. In one embodiment, the at least one service comprises at least one service attribute. In one further embodiment, at least a portion of the service features associated with a particular service comprise at least one service attribute. In one embodiment, the at least one service attribute identifies at least one BE capable of supporting the at least one service.

In one embodiment, a service attribute comprises information for identifying at least one call handling treatment and at least one media handling treatment operable for providing a service (or a particular feature of the service) to a user subscribed to that service. Since call handling treatments and media handling treatments may operate using specific network resources, service attributes may indirectly identify network resources required for providing a service (or service feature) to a user. In one embodiment, at least one treatment is selected according to the at least one service attribute. In one embodiment, a treatment comprises at least one of: a call handling treatment and a media handling treatment.

For example, a user initiating a connection request may subscribe to a service comprising a three-way calling service feature activated using an in-band request (e.g., activated by a user after connection establishment using DTMF signaling). The three-way calling service feature may comprise a service attribute specifying that DTMF detection is required for providing that service feature. The DTMF detection service attribute may then be used for identifying at least one border element capable of supporting DTMF detection in support of the requested three-way calling service.

At step 308, at least one call handling treatment is identified according to the at least one service attribute. In one embodiment, a call handling treatment comprises a rule-based mechanism for determining an optimum method for responding to a service request. For example, a call handling treatment may comprise a rule specifying that a connection request initiated by one of the network endpoints 106$_A$ is validated by CAC 132 before the called network endpoint (e.g., one of network endpoints 106$_B$) is signaled to provide an indication of an incoming call.

Similarly, a call handling treatment may comprise a rule specifying that a connection request be forwarded to a particular voicemail server in response to an indication that a called party is unresponsive to an incoming call. In continuation of the above example, the call handling treatment identified according to the DTMF detection service attribute may specify that a CE operable for responding to three-way calling service requests maintain control over the requested connection (including connection establishment control, connection management control, and the like).

At step 310, at least one media handling treatment is identified according to the at least one service attribute. In one embodiment, a media handling treatment comprises a rule-based mechanism for determining an optimum method for supporting a media stream. For example, a media handling treat may comprise a rule whereby the media stream associated with a user subscribed to a service requiring DTMF detection traverses at least one network element capable of detecting DTMF signals.

In continuation of the above example, the media handling treatment identified according to the DTMF detection service attribute may specify that the media stream of the established connection must traverse BEs capable of detecting and responding to DTMF tones (entered by the user for invoking the three-way calling service feature). Similarly, the media handling treatment may specify that the BEs traversed by the media stream must be controlled by a particular CE 110 capable of handling service requests received from the BEs in response to DTMF tones initiated via a network endpoint.

In one embodiment, selection of a border element according to at least one service attribute comprises identifying at least one call handling treatment (capable of supporting the at least one service) according to the at least one service attribute, identifying at least one media handling treatment (capable of supporting the at least one service) according to the at least one service attribute, and selecting the at least one border element according to at least one of: the at least one call handling treatment and the at least one media handling treatment.

At step 312, at least one border element is selected. In one embodiment, the at least one border element is operable for supporting the at least one call handling treatment and the at least one media handling treatment. In continuation of the above example, the selected border elements comprise BEs supporting DTMF detection (e.g., BEs $112_{A1}$ and $112_{B1}$, as described herein). In another embodiment, selection of at least one border element may comprise selection of at least one associated network resource for providing the requested service (e.g., a CE operable for managing the BEs supporting DTMF detection).

At step 314, at least one connection is established using the at least one border element and at least one network resource. In continuation of the above example, the requested connection between one of the network endpoints $106_A$ and one of the network endpoints $106_B$ is established such that the associated media stream traverses the selected border elements BE $112_{A1}$ and BE $112_{B1}$. Furthermore, in this example, the requested connection is established such that CE $110_1$ maintains control over the media stream traversing BEs $112_{A1}$ and $112_{B1}$ (for handling invocation of a request for the three-way calling service). In one example, in which a connection is established using at least one network resource (in addition to the at least one border element), the network resource may comprise CAC 132 (for responding to the invocation of the three-way calling service feature by the user).

At step 316, a determination is made as to whether a connection (i.e., one of the at least one established connections) is terminated (e.g., the calling party hangs up, the called party hangs up, and the like). If a connection is terminated, method 300 proceeds to step 322, where method 300 ends. If a connection is not terminated, method 300 proceeds to step 318. At step 318, a determination is made as to whether a service request is received. If a service request is not received, method 300 returns to step 316. In other words, continuous monitoring for detecting the termination of the connection is performed. If a service request is received, method 300 proceeds to step 320.

At step 320, the service request is responded to using the at least one border element and the at least network resource. In continuation of the above example, assume that the network endpoint $106_A$ that initiated the connection establishment initiates a request (using at least one DTMF tone) for invoking the three-way calling service feature. In this example, BE $112_{A1}$ detects the DTMF tones and signals CE $110_1$ to provide an indication of a three-way calling service request. The CE $110_1$ signals the appropriate network resources required for associating the called third party to the existing media stream.

It is contemplated that at least a portion of the described functions may be combined into fewer functional elements/devices, may be performed by other functional elements, or that the various functions may be distributed across the functional elements in a different manner. For example, at least a portion of the functionality described herein with respect to NRSS 108 may be distributed across at least a portion of the ANs 104, CEs 110, BEs 112, RSs 120, and SEs 130. Furthermore, at least a portion of the functionality described herein with respect to NRSS 108 may be implemented using a plurality of NRSSs.

Figure 4:
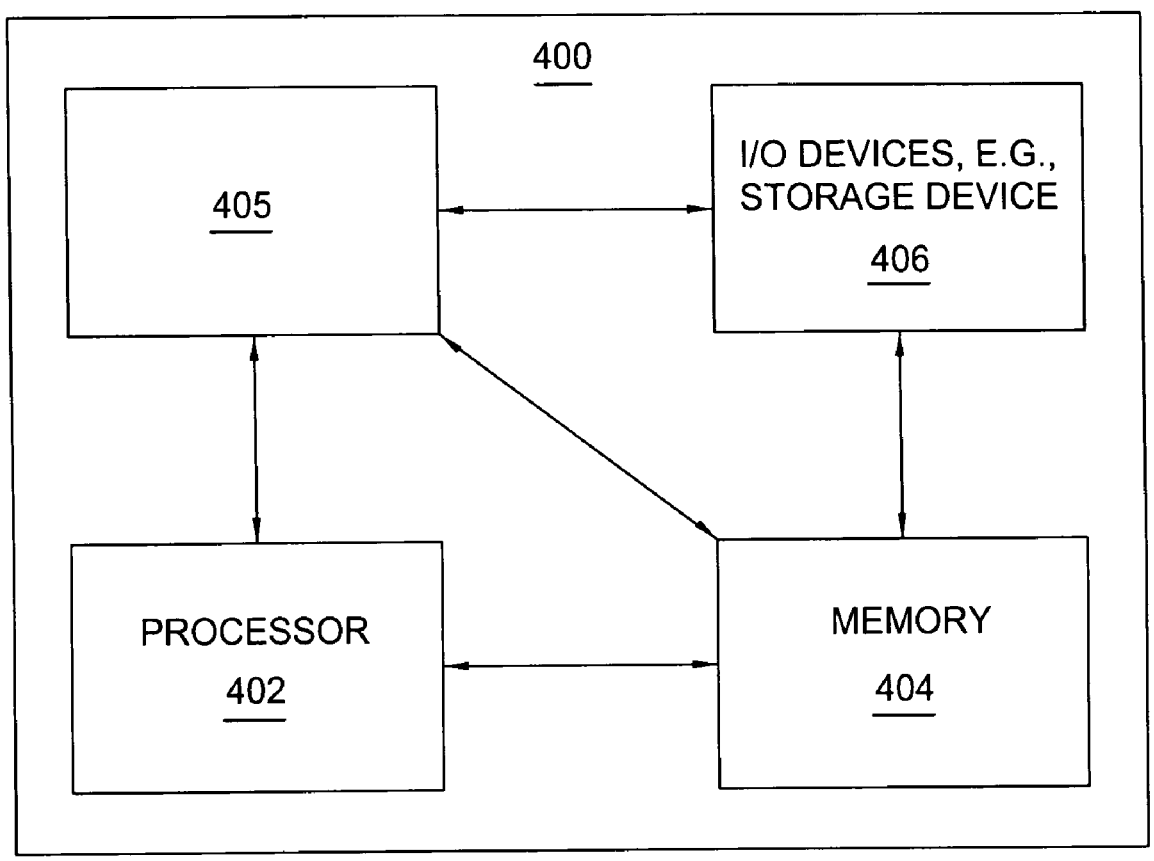
FIG. 4 depicts a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a network resource selection module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present network resource selection module or process 405 can be loaded into memory 404 and executed by processor 402 to implement the functions as discussed above. As such, the present network resource selection process 405 (including associated data structures) of the present invention can be stored on a computer readable medium or carrier, e.g., RAM memory, magnetic or optical drive or diskette, and the like.

Although various embodiments which incorporate the teachings of the present invention have been shown and described in detail herein, those skilled in the art can readily devise many other varied embodiments that still incorporate these teachings.

What is claimed is:

1. A method for providing a service, comprising:
   obtaining a connection request associated with a user;
   querying, via a network resource selection system, a service subscription database to determine
   the service subscribed to by the user, the service comprising a service attribute, wherein the service attribute identifies a border element for supporting the service;
   selecting, via the network resource selection system, the border element from a plurality of border elements according to the service attribute, wherein at least two of the plurality of border elements are configured to provide a different functionality to support the service and a service element that provides a network resource to support the service, wherein the service element comprises a call admission controller, a network routing engine, a service broker and a user profile engine; and
   responding to the connection request using the border element and the service element.

2. The method of claim 1, wherein the border element supports a treatment, wherein the treatment comprises a handling treatment.

3. The method of claim 1, wherein the selecting comprises:
   identifying a call handling treatment according to the service attribute, the call handling treatment for supporting the service;
   identifying a media handling treatment according to the service attribute, the media handling treatment for supporting the service; and
   selecting the border element according to a needed handling treatment.

4. The method of claim 1, further comprising:
   responding to a service request using the border element and the service element.

5. The method of claim 4, wherein the service request comprises an in-band service request.

6. A non-transitory computer readable medium storing software program, that, when executed by a computer, causes the computer to perform a method comprising:
   obtaining a connection request associated with a user;
   querying, via a network resource selection system, a service subscription database to determine
   the service subscribed to by the user, the service comprising a service attribute, wherein the service attribute identifies a border element for supporting the service;
   selecting, via the network resource selection system, said at least one the border element from a plurality of border elements according to the service attribute, wherein at least two of said the plurality of border elements are configured to provide a different functionality to support the service and a service element that provides a network resource to support the service, wherein the service element comprises a call admission controller, a network routing engine, a service broker and a user profile engine; and responding to the connection request using the border element and the service element.

7. The computer readable medium of claim 6, wherein the border element supports a treatment, wherein the treatment comprises a handling treatment.

8. The computer readable medium of claim 6, wherein the selecting comprises:

identifying a call handling treatment according to the service attribute, the call handling treatment for supporting the service;

identifying a media handling treatment according to the service attribute, the media handling treatment for supporting the service; and selecting the border element according to a needed handling treatment.

9. The computer readable medium of claim 6, further comprising:

responding to a service request using the border element and the service element.

10. The computer readable medium of claim 9, wherein the service request comprises an in-band service request.

11. An apparatus for providing at least one service, comprising:

means for obtaining a connection request associated with a user;

a network resource selection system for querying a service subscription database to determine the service subscribed to by the user, the service comprising a service attribute, wherein the service attribute identifies a border element for supporting the service and for selecting the border element from a plurality of border elements according to the service attribute, wherein at least two of the plurality of border elements are configured to provide a different functionality to support the service and a service element that provides a network resource to support the service, wherein the service element comprises a call admission controller, a network routing engine, a service broker and a user profile engine; and means for responding to the connection request using the border element and the service element.

12. The apparatus of claim 11, wherein the border element supports a treatment, wherein the treatment comprises a handling treatment.

13. The apparatus of claim 11, wherein the network resource selection system is further for identifying a call handling treatment according to the service attribute, the call handling treatment for supporting the service, for identifying a media handling treatment according to the service attribute, the media handling treatment for supporting the service, and for selecting the border element according to a needed handling treatment.

14. The apparatus of claim 11, further comprising:

means for responding to a service request using the border element and the service element.

* * * * *